United States Patent
Dahlstrom

(10) Patent No.: US 10,399,676 B2
(45) Date of Patent: Sep. 3, 2019

(54) INDOOR AND OUTDOOR AERIAL VEHICLES FOR PAINTING AND RELATED APPLICATIONS

(71) Applicant: Working Drones, Inc., Jacksonville, FL (US)

(72) Inventor: Robert L. Dahlstrom, Jacksonville, FL (US)

(73) Assignee: WORKING DRONES, INC., Jacksonville, FL (US)

(*) Notice: Subject to any disclaimer, the term of this patent is extended or adjusted under 35 U.S.C. 154(b) by 156 days.

(21) Appl. No.: 14/674,524

(22) Filed: Mar. 31, 2015

(65) Prior Publication Data

US 2015/0274294 A1    Oct. 1, 2015

Related U.S. Application Data

(60) Provisional application No. 61/972,535, filed on Mar. 31, 2014.

(51) Int. Cl.
| | |
|---|---|
| *B64D 1/18* | (2006.01) |
| *B05B 13/00* | (2006.01) |
| *B05B 13/02* | (2006.01) |
| *B05B 9/04* | (2006.01) |

(52) U.S. Cl.
CPC .............. *B64D 1/18* (2013.01); *B05B 9/0403* (2013.01); *B05B 13/005* (2013.01); *B05B 13/0278* (2013.01); *A46B 2200/202* (2013.01); *B64C 2201/027* (2013.01); *B64C 2201/12* (2013.01)

(58) Field of Classification Search
CPC ....... B64D 1/18; B05B 9/0403; B05B 13/005; B05B 13/0278; A46B 2200/202; B64C 2201/12; B64C 2201/027

USPC .............................. 239/171, 69; 169/52
See application file for complete search history.

(56) References Cited

U.S. PATENT DOCUMENTS

| | | | | |
|---|---|---|---|---|
| 3,904,117 A | * | 9/1975 | Adams, Jr. ............. | A62C 27/00 239/146 |
| 5,552,883 A | | 9/1996 | Busch-Vishniac et al. | |
| 7,628,529 B2 | * | 12/2009 | Shoemaker ............... | B01F 7/22 137/571 |
| 7,735,752 B1 | * | 6/2010 | Songer ..................... | B64D 1/18 239/163 |
| 8,251,307 B2 | * | 8/2012 | Goossen ............... | B64C 39/024 244/23 C |

(Continued)

FOREIGN PATENT DOCUMENTS

WO    WO2012094430 A2 *    7/2012    .............. B25J 13/00

*Primary Examiner* — Alexander M Valvis
*Assistant Examiner* — Qingzhang Zhou
(74) *Attorney, Agent, or Firm* — Terry M. Sanks, Esq.; Beusse Wolter Sanks & Maire, PLLC

(57) ABSTRACT

An aerial operations system for performing various tasks such as painting is provided. The modular aerial operations system includes an aerial vehicle capable of vertically taking off and landing, hovering and precisely maneuvering near walls and other structures. The aerial vehicle may be a rotorcraft such as a multicopter. In an aspect, as aerial vehicle paints one or more designated surfaces using detachable arms and equipment. The system may paint the designated surface in one of several available techniques using paint provided in a container such as an attached reservoir, a base station, a paint can, or the like. The aerial operations system provided may also be configured to perform a variety of other tasks.

28 Claims, 11 Drawing Sheets

(56) References Cited

U.S. PATENT DOCUMENTS

| | | | |
|---|---|---|---|
| 2010/0085185 A1 | 4/2010 | Nielsen et al. | |
| 2011/0212254 A1 | 9/2011 | Morton | |
| 2011/0315810 A1* | 12/2011 | Petrov | B64C 39/022 244/17.23 |
| 2012/0261483 A1* | 10/2012 | Elberson | G05D 11/132 239/1 |
| 2013/0134254 A1* | 5/2013 | Moore | B64D 1/16 244/17.11 |
| 2013/0325217 A1 | 12/2013 | Seydoux et al. | |
| 2014/0236388 A1* | 8/2014 | Wong | B64C 39/024 701/2 |
| 2014/0303814 A1* | 10/2014 | Burema | A01B 79/005 701/3 |
| 2015/0041598 A1 | 2/2015 | Nugent et al. | |
| 2015/0148949 A1* | 5/2015 | Chin | G05D 1/0246 700/245 |
| 2016/0082460 A1 | 3/2016 | McMaster et al. | |

\* cited by examiner

INDOOR AND OUTDOOR AERIAL VEHICLES FOR PAINTING AND RELATED APPLICATIONS

CROSS REFERENCE TO RELATED APPLICATION

This application claims the benefit of U.S. Provisional Patent Application No. 61/972,535, filed Mar. 31, 2014, and entitled "Indoor and Outdoor Aerial Vehicles for Painting and Related Applications," the entire contents of which are hereby incorporated herein by reference.

FIELD OF THE DISCLOSURE

The present disclosure generally relates to unmanned aerial vehicles and more particularly to apparatus, systems and methods for carrying out tasks using unmanned aerial vehicles.

BACKGROUND

The statements in this section merely provide background information related to the present disclosure and may not constitute prior art.

Coating or painting interiors and exteriors of structures is often a precise, tedious and time consuming task. It can often be a dangerous task as well. In order to paint even the simplest of interior walls, the area must first be prepared. Painter's tape, drop cloths, and other barriers are temporarily put in place in order to protect areas from the unwanted application of paint. In order to ensure strong adhesion of the new paint, the wall itself may also be cleaned.

Next, the borders of the wall must be cut in. That is, the edges of the wall must be painted with particular care in order to avoid painting the ceiling, the floor, door frames and the like. Cutting in is typically done by hand with a small brush. The painter may carry around a paint can or a small container of paint and slowly paint the top edge, side edges, intermediate edges, and bottom edge of the wall. Cutting in often requires the painter to spend significant amounts of time bent over, standing on ladders, and moving painting equipment along the wall. It is not uncommon for cutting in to occupy at least half of the time spent painting a single surface. Cutting in also occurs around certain permanent items such as electrical outlets or switches, ceiling fans, etc.

After cutting in, the bulk of the wall may be painted. Such large area painting may be performed utilizing the small brushes used to cut in. At the cost of additional equipment and set up time, paint rollers, spray apparatus and other devices may be used to speed this portion of the process. Paint rollers, for example, are typically nine inches wide and may be attached to a broom handle or the like, enabling the painter to apply a coat of paint to a large area of a wall with minimal effort.

When using any type of paint applicator, the painter must take care to ensure that a uniform amount of paint is applied per square inch of the wall. Among other considerations, this ensures that the finished wall has a uniform appearance. That is, no colors from underneath bleed through. Furthermore, despite likely using multiple types of applicators, the painter must ensure that the texture of the applied paint is uniform. For example, where a smooth finish is desired, the painter must hide the brush strokes in the applied paint.

Once a first coat of paint is applied to a surface being painted, additional coats may be needed. Where this is the case, the painter must wait for the previous coat of paint to dry, reset the equipment for applying the next coat, and begin the process again. Wait time between applications of coats is problematic. The painter often wished to complete the job as quickly as possible but may be unfamiliar with the minimum amount of time necessary to wait between coats. The wait time is heavily influenced by environmental factors such as ambient temperature and humidity. Furthermore, many painters will not apply a coat of paint to an exterior surface of a structure if the weather forecast calls for rain within twelve hours.

In some regimes, robotic devices are suited to perform basic, tedious and/or time-consuming tasks. For example, Roomba® cleaning devices (available from iRobot Corporation of Bedford, Mass.) semi-autonomously vacuum interior floors, eliminating or reducing the need for an individual to clean the floor frequently.

Autonomous and semi-autonomous flying vehicles have been developed which are capable of flying precise flight patterns, identifying and avoiding obstacles in a flight path and taking off or landing at a desired location.

Given the foregoing, apparatus, systems and methods are needed which facilitate painting surfaces via a robotic vehicle. Additionally, apparatus, systems and methods are needed which facilitate reducing or eliminating the human labor component of painting a surface such an interior wall, exterior of a house, or the like.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus, systems, and methods which facilitate painting surfaces via an aerial vehicle, such as a robotic vehicle. In some aspects, such vehicles reduce or eliminate the human labor component of painting a surface such an interior wall, exterior of a house, or the like, while increasing the precision of paint application.

In an aspect, an aerial operations system for painting is provided which paints one or more designated surfaces. Paint may be supplied from a ground station via a tether. Painting may be done using detachable arms and/or equipment. The system may paint the designated surface in one of several available techniques (e.g., smooth finish, stipple finish, sponge painting, rag wipe finish, and the like) using paint provided in a container such as an attached reservoir, a base station, a paint can, or the like. The modular aerial operations system includes an aerial vehicle capable of vertically taking off and landing, hovering and precisely maneuvering near walls and other structures. The aerial vehicle may be a rotorcraft such as a multicopter (e.g., a quadcopter), or other appropriate vehicles. In order to paint a designated surface, the aerial vehicle includes a paint dispensing system such as a sprayer. The sprayer is connected to a paint source, such as an onboard paint reservoir or a ground based reservoir and tether system, and is controlled by an onboard computing device. The aerial vehicle also includes a sensor suite which detects obstacles as well as surfaces designated to be painted. A command and control module within the onboard computing device receives inputs from the sensor suite and causes the aerial vehicle to maneuver a desirable distance from surfaces to be painted. When the aerial vehicle is in a desired location, the sprayer or other painting device is activated, applying paint to the desired surface (e.g., an interior wall, an exterior wall, shutters, furniture, or portions thereof).

The aerial operations system further includes a base station. The base station may provide a home location for the aerial vehicle, data transfer connections, power connections, and/or an additional paint reservoir. In some aspects, the base station is omitted.

In an aspect, the aerial operations system is modular, enabling utilization of a variety of extensions, arms, and add-ons. For example, the aerial operations system may comprise removable paint application portions enabling sample collection arms, brush arms, squeegee arms, duster arms, and the like to be attached and utilized.

In some aspects, the aerial vehicle is programmable and operates autonomously or semi-autonomously. In another aspect, the aerial vehicle is remotely piloted by a user. That is, the user may use a remote control to pilot the aerial vehicle and paint a designated surface.

In some aspects, attachments are included such as movable physical barriers, which are used to protect or mask areas from being painted.

Aspects of the present disclosure reduce the need to place protective barriers such as drop cloths, painter's tape, scaffolding, and the like around the area to be painted because the aerial vehicle precisely applies paint when equipped with painting tools. Furthermore, apparatus in accordance with the present disclosure reduce or eliminate the human labor component of tasks such as interior and exterior painting, window cleaning, yard work, and the like.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed apparatus, systems, and methods which facilitate painting surfaces via an aerial vehicle, such as a robotic vehicle. In some aspects, precision of paint application to surfaces such as an interior wall, an exterior of a house, building or other structure such as a bridge or tower, and portions thereof is increased. Further, in some aspects of the present disclosure there is reduced need to place protective barriers such as drop cloths, painter's tape, and the like around the area to be painted because the aerial vehicle precisely applies paint when equipped with painting tools. Furthermore, apparatus in accordance with the present disclosure reduce or eliminate the human labor component of tasks such as interior and exterior painting, window cleaning, yard work, and the like.

In an aspect, an aerial operations system for painting and other operations is provided. The aerial operations system includes a base station, an aerial vehicle, and one or more attachments for facilitating tasks such as painting, cleaning, sample collection and the like. In some aspects, the base station is omitted. One or more attachments may be integrated into the aerial vehicle. In some aspects, the aerial vehicle is configured to perform a single purpose, such as painting interior locations.

Aerial operations systems may be configured to facilitate painting or otherwise spraying sprayable material on a variety of objects such as walls, building exteriors, furniture, vehicles, signs, portions thereof and other items apparent to those skilled in the relevant art(s) after reading the description herein. The aerial operations system may paint the designated surface in one of several available techniques (e.g., smooth finish, stipple finish, sponge painting, rag wipe finish, and the like) using paint provided. In other aspects, aerial operations system may be configured to apply coatings, spray high pressure liquid or air in order to remove portions of an object, or the like.

Figure 1:
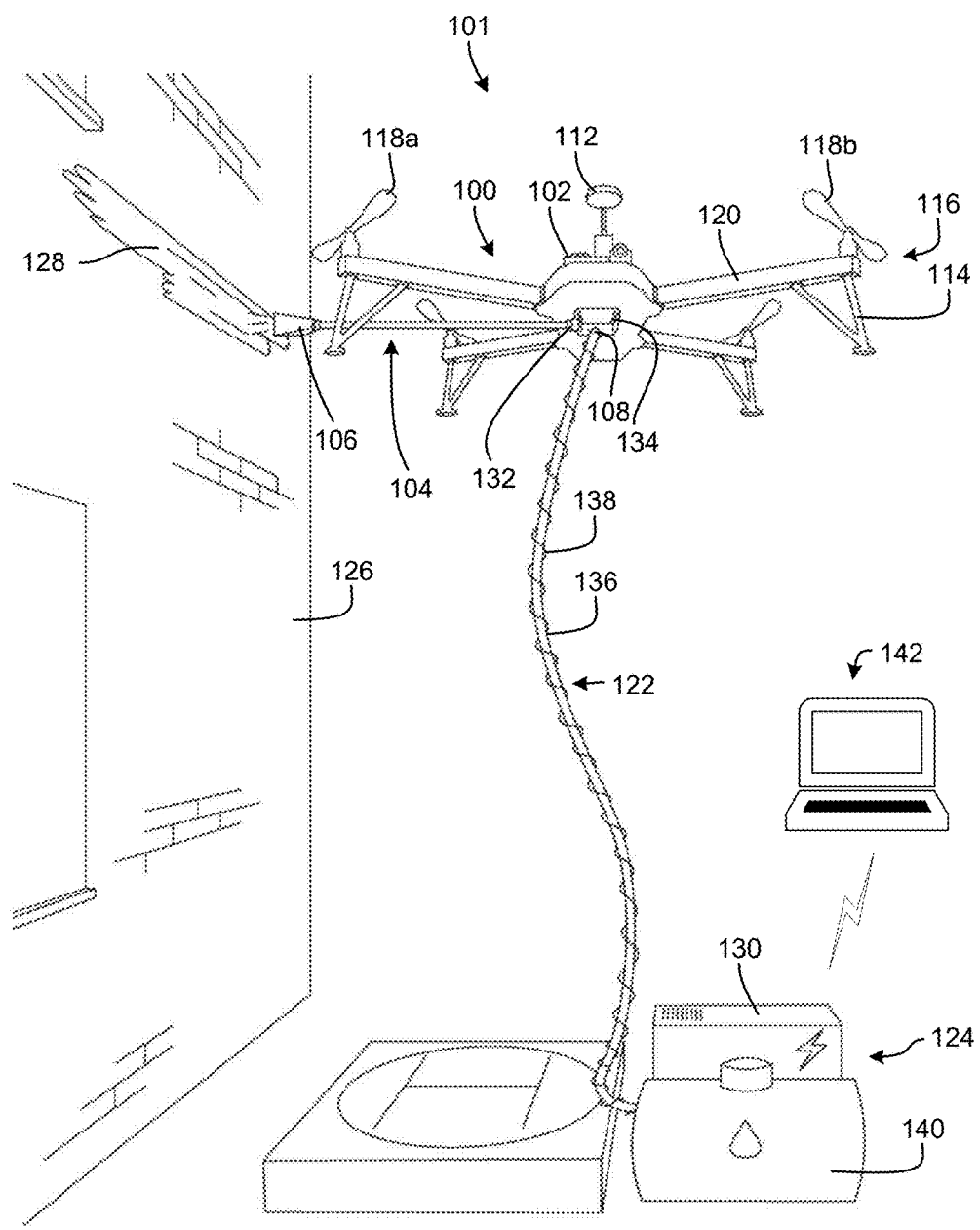
FIG. 1 is a perspective view of an aerial operations system equipped with a paint sprayer painting the wall of a structure, according to various aspects of the present disclosure.
Figure 2:
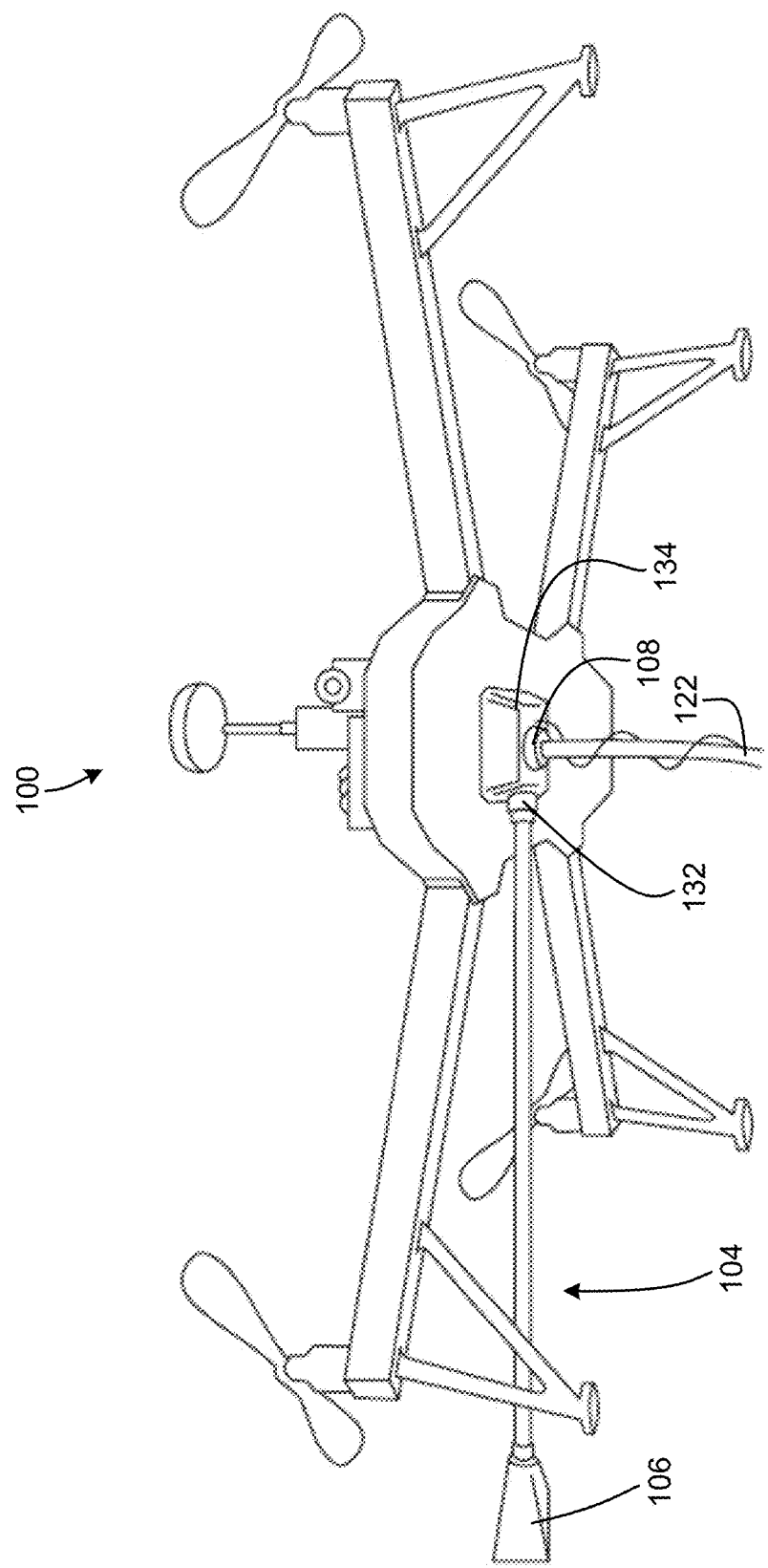
FIG. 2 is a perspective view of an aerial operations system including a paint sprayer, according to various aspects of the present disclosure.

Referring now to FIGS. 1 and 2, a perspective view of an aerial operations system 101 equipped with a paint sprayer or accessory 104 and a detail view of an aerial vehicle 100 portion of aerial operations system 101, according to various aspects of the present disclosure, are shown.

The aerial operations system 101 may include an aerial vehicle 100 tethered to a base station 124. In some aspects, the tether 122 and/or base station 124 are omitted and portions necessary to the functionality of aerial operations system 101 are integrated into aerial vehicle 100.

Aerial vehicle 100 may be capable of vertically taking off and landing, hovering and precisely maneuvering near walls or other objects 126. Aerial vehicle 100 may be a rotorcraft such as a multicopter (e.g., a quadcopter). Aerial vehicle 100 is operated by command and control systems 102 which may include aerial vehicle based components and/or ground based command and control components (contained within ground power source 130 in FIG. 1). Aerial vehicle 100 also includes multiple rotor arms 116, one or more accessories 104 or add-ons such as paint sprayer, a tether connection portion 108, at least one sensor 112, and landing system 114. Landing system 114 may be legs, skids, skis, or the like. In some aspects, aerial vehicle 100 includes additional elements, as shown in FIG. 2. In other aspects, portions may be omitted from aerial vehicle 100. Each rotor arm 116 includes a rotor 118 at an end portion of a boom 120. In some aspects, aerial vehicle 100 incorporates the propellers into the body of the vehicle and there is no arm or boom. In such aspects there may or may not be prop guards enclosing the propellers. The term accessory 104 and add-on 104 are used interchangeably herein.

Tether connection portion 108 connects tether 122 to aerial vehicle 100. Tether connection 108 may be a permanent or removable connection and be configured to provide data, power, and fluid connections to or from aerial vehicle 100. Tether may include a liquid transportation channel 136 and an electrical and/or data connection 138. Electrical and/or data connection 138 supplies power to aerial vehicle 100, including onboard back up batteries, from ground power such as shore power (e.g., a wall socket) or ground power source 130.

Onboard command and control system 102 receives inputs from sensors 112 and/or base station 124 including sensors such as omnidirectional sensor in order to determine positioning of aerial vehicle 100 relative to its surroundings. Command and control system 102 controls a plurality of rotors (labeled as rotors 118a and 118b in FIG. 1) in order to pilot aerial vehicle 100, controlling altitude and attitude, including pitch, yaw and angular orientation. Onboard command and control system 102 may receive instructions from a user to fly to a designated area and perform a task (e.g., paint a wall, cut in portions of the wall, paint an image on a wall, and the like). Such instructions may be received via direct data connection, wireless data connection, or input via an integrated input device. Aerial vehicle 100 may operate autonomously after receiving instructions. In another aspect, a user pilots aerial vehicle 100 to the designated area and causes aerial vehicle 100 to perform the desired task be sending a series of commands (i.e., remote control operation). One such command may be to paint a desired portion of a wall by flying in a raster pattern and spraying paint on the wall during the flying of the pattern. Another command may be to "blot out" an electrical receptacle whereby the aerial vehicle 100 would paint the electrical wall receptacle with the same paint of the same color as the surrounding wall and would not cut in around the receptacle leaving it unpainted.

During autonomous or semi-autonomous operation, command and control system 102 utilizes the sensors to position aerial vehicle 100 in advantageous positions and orientations in order to carry out the desired task. For example, where aerial vehicle 100 is painting a structure, command and control system 102 pilots aerial vehicle 100 to an ideal distance away from the structure in order to paint the structure via accessory 104 adapted for painting, such as a sprayer, a brush, or other instrument apparent to those skilled in the relevant art(s) after reading the description herein. For example, accessory 104 may comprise a spray nozzle 106 for applying paint 128 or another sprayable material. Spray nozzle 106 may be configured to optimally apply paint when positioned normal to the surface being painted and offset three to six inches or a predetermined or automatically calculated distance (by calculating the wind speed, spray material viscosity, desired thickness of the applied material, etc.). In this instance command and control system 102 will detect the surface using sensors and pilot aerial vehicle to an attitude and position where spray nozzle 106 is an appropriate distance (e.g., three to six inches) from the surface being painted and normal to the surface.

Command and control system 102 additionally controls the action of accessories 104. For example, a paint applicator is activated by command and control system 102 when aerial vehicle 100 reaches the desired location relative to the surface to be painted. Command and control system 102 may be preprogrammed with a flight path to paint such an object or it may contain algorithms which determine, on-the-fly, the appropriate actions to take in order to paint the specified surface(s). Further, video cameras and/or other sensors attached to the aerial vehicle 100 or an arm or one or more attachments can monitor the paint application and adjust the paint flow or paint pressure or require the aerial vehicle 100 to complete an additional "pass" over the area with another spray for optimal paint application and coverage. That is, sensors such as cameras may be used to detect "skips" or "holidays" (instances where the paint application is not optimal and some of the old paint color may show through). Based on this detection, command and control system may cause aerial vehicle 100 to repaint such deficient areas.

Aerial vehicle 100 may measure local environment properties such as the ambient temperature, humidity and the like in order to determine the optimal parameters for applying any subsequent coat(s) of paint. Furthermore, where aerial vehicle 100 is painting outside or performing other tasks in an outdoor environment, aerial vehicle 100 may be programmed to access weather forecast data from third party sources and determine the appropriate timeframe to complete such tasks. The aerial vehicle 100 may also access the manufacturer of the paint or material being applied or sprayed or a general knowledge repository such as the internet for information about the material being applied such as optimal viscosity, level or volume of material required for various surfaces (such as the microns of thickness the paint should be applied), known failures or best management practices of application of the material etc.

Accessory 104 may be an appendage or other member attached or removably attachable to aerial vehicle 100 at accessory attachment point 132. Accessory attachment point 132 may be a quick release mechanism. Accessory 104 may be changed in order to adapt aerial vehicle 100 to specific uses. Accessory may comprise an accessory attachment point, such as a spray nozzle as described above. In some aspects, aerial vehicle 100 comprises multiple accessories 104. Some accessories 104 are equipped with sensors such as pressure sensors in order to aid in precisely identifying the location of walls and the like. Accessory 104 may include additional sensors.

Accessories 104 may be rigidly mounted to aerial vehicle 100 or they may be mounted for movement on a mount 134. Mount 134 may comprise one or more motors or actuators controllable by command and control system 102 in order to adjust the orientation of, extend, retract, rotate, or otherwise manipulate and position, for example, attached spray nozzle 106. Such movement is advantageous for cleaning, painting, orienting accessory 104 to reach or point in directions that are otherwise inaccessible and the like. Specifically, a painting accessory attached for movement to aerial vehicle 100 may be pitched upward by causing motor to point accessory 104 upward, altering the attitude of aerial vehicle 100 by pitching a portion of the vehicle 100 upward, or both, in order to cut in near the top of an interior wall. Such action may be necessary in order to avoid running into the ceiling or other obstacle.

Sensors includes one or more sensors 112 which aid the operation of aerial vehicle 100. Sensors may include cameras, infrared sensors, GPS transceivers, magnetometers, laser range finders, sonar, lidar, radar, and other types of sensors or positioning devices apparent to those skilled in the relevant art(s) after reading the description herein. Inertial sensors, displacement sensors, gyroscopes, and other devices may also be integrated. Omnidirectional sensor, sensors located on other portions of aerial vehicle 100 and command and control system 102 may operate in concert to form a guidance navigation and control system for aerial vehicle 100. Accessories 104 may also be attached to the end of the rotor arms/booms, the top of aerial vehicle 100 or other location and may contain elbows. Bends, or flexible (rigid or semi rigid) portions.

Aerial vehicle 100 may further include one or more visual or audio alert devices such as speakers, LEDs, and the like. Such alert devices may be utilized to warn bystanders to avoid aerial vehicle 100, indicate status of aerial vehicle 100 (e.g., battery status, onboard supply status, task completion status).

In some aspects, aerial vehicle 100 is battery powered and power source 130 is a rechargeable battery. In other aspects, aerial vehicle is powered by liquid or gaseous fuels and power source 130 is a storage tank for such fuel. Power source 130 may also include an electrical converter, uninterrupted power supply (UPS), or the like. Power source 130 may be an electrical connection to grid power or another source of power.

Input device 142, such as a computing device is communicatively connected to aerial operations system 101 in order to receive input from a user, thereby operating, monitoring and/or commanding. Input device 142 may be a personal computing device, a terminal built into base station, a remotely located device, or any other device for receiving user inputs apparent to those skilled in the relevant art(s) after reading the description herein.

In some aspects, aerial vehicle 100 comprises an onboard reservoir. The onboard reservoir may hold a sprayable material such as a liquid, gas, foam or other material to be dispersed. In some aspects, such as aerial vehicle 100 equipped with a vacuum accessory, and onboard reservoir is configured to hold collected material. The onboard reservoir may be filled or emptied by a user or by portions of base station 124. The onboard reservoir may be modular and detachable via container connectors, thereby enabling aerial vehicle 100 to rapidly connect and disconnect from multiple onboard reservoirs. In some aspects, the connection is performed autonomously. In some aspects, onboard reservoir is a one-gallon, one-quart, or other standard size paint can.

Aerial vehicle 100 may be attached to the ground or base station 124 via a tether 122. In some aspects, tether 122 is electrically connected to aerial vehicle 100 and connected to the local power grid via, for example, a domestic outlet, in order to provide power to aerial vehicle 100. Tether 122 may be connected to an onboard reservoir or another portion of aerial vehicle 100 in order to provide, receive or discharge sprayable material. For example, aerial operations system 101 may comprise a base station 124 having a large paint reservoir 140 or other ground-based sprayable material reservoir or source (e.g., a water connection). Paint from paint reservoir 140 may be transported to aerial vehicle 100 via tether connection. Tether 122 is a length appropriate for performing the desired task or may be longer than needed and may or may not contain a reel or other tether management device. Tether 122 may also be used to exchange data and information between base station 124 or some other connected device and aerial vehicle 100. Tether 122 and/or portions of vehicle 100 is designed to be used in underwater and other environments such as inside storage tanks, pipes or ducts, crawl spaces, or the like.

Figure 3:
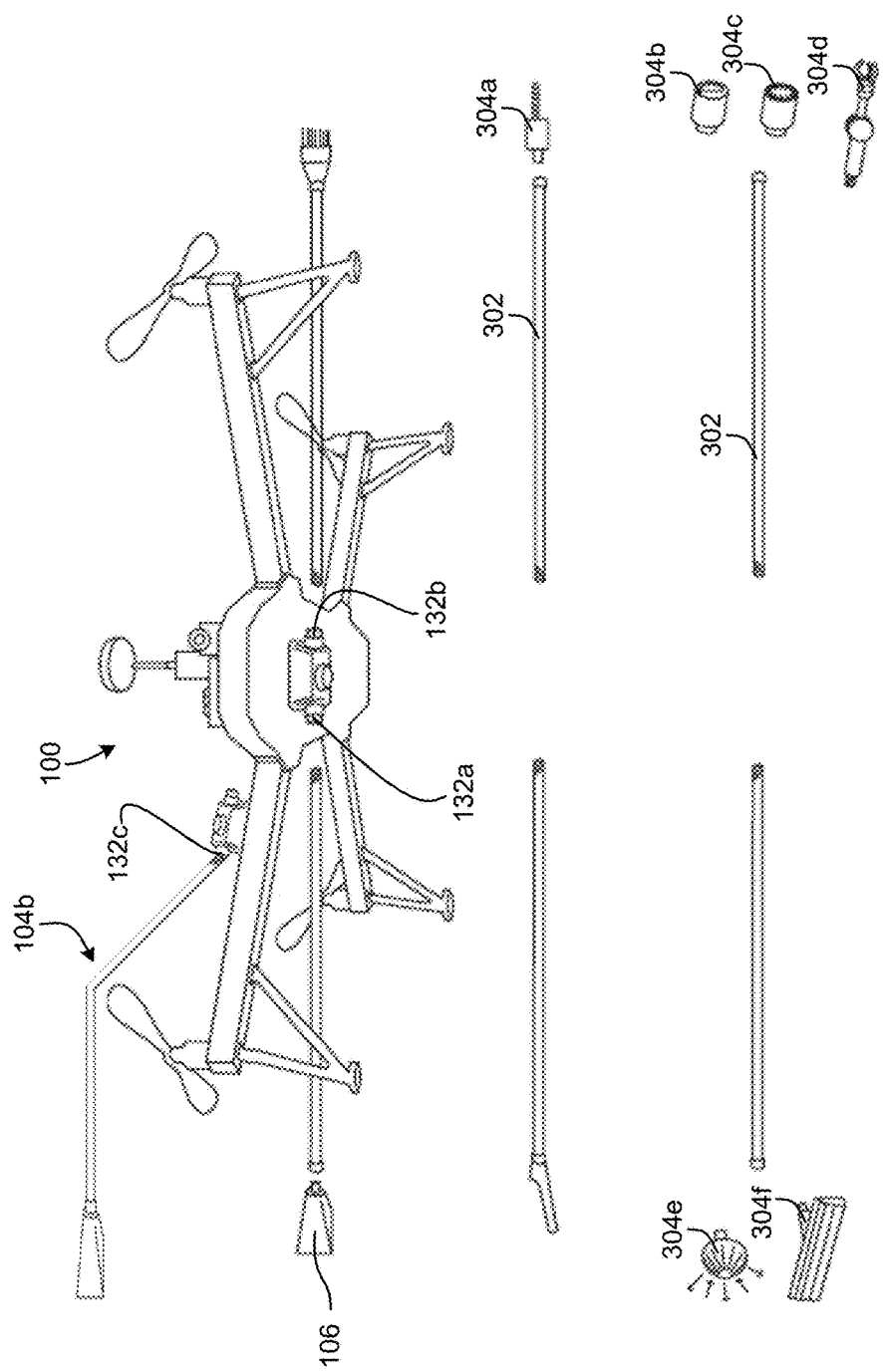
FIG. 3 is a perspective view of an aerial vehicle having multiple add-on attachment points, according to various aspects of the present disclosure.

Referring now to FIG. 3, a perspective view of an aerial vehicle 100 having multiple add-on attachment points 132*a*, 132*b*, and 132*c* according to various aspects of the present disclosure, is shown. Aerial vehicle may be modular in that add-ons 104 may be attached and detached at attachment points 132*a*, 132*b*, and 132*c*. Attachment points 132*a*, 132*b*, and 132*c* may be located anywhere on aerial vehicle 100. An add-on 104 may include an extension 302 connectable to one of many end effectors 304*a*, 304*b*, 304*c*, 304*d*, 304*e* and 304*f*. Attachment points 132*a*, 132*b*, and 132*c* may be located at a variety of locations on aerial vehicle 100. Multiple add-ons 104 may be mounted on aerial vehicle simultaneously, including one or more off-set add-ons 104*b*.

Figure 4:
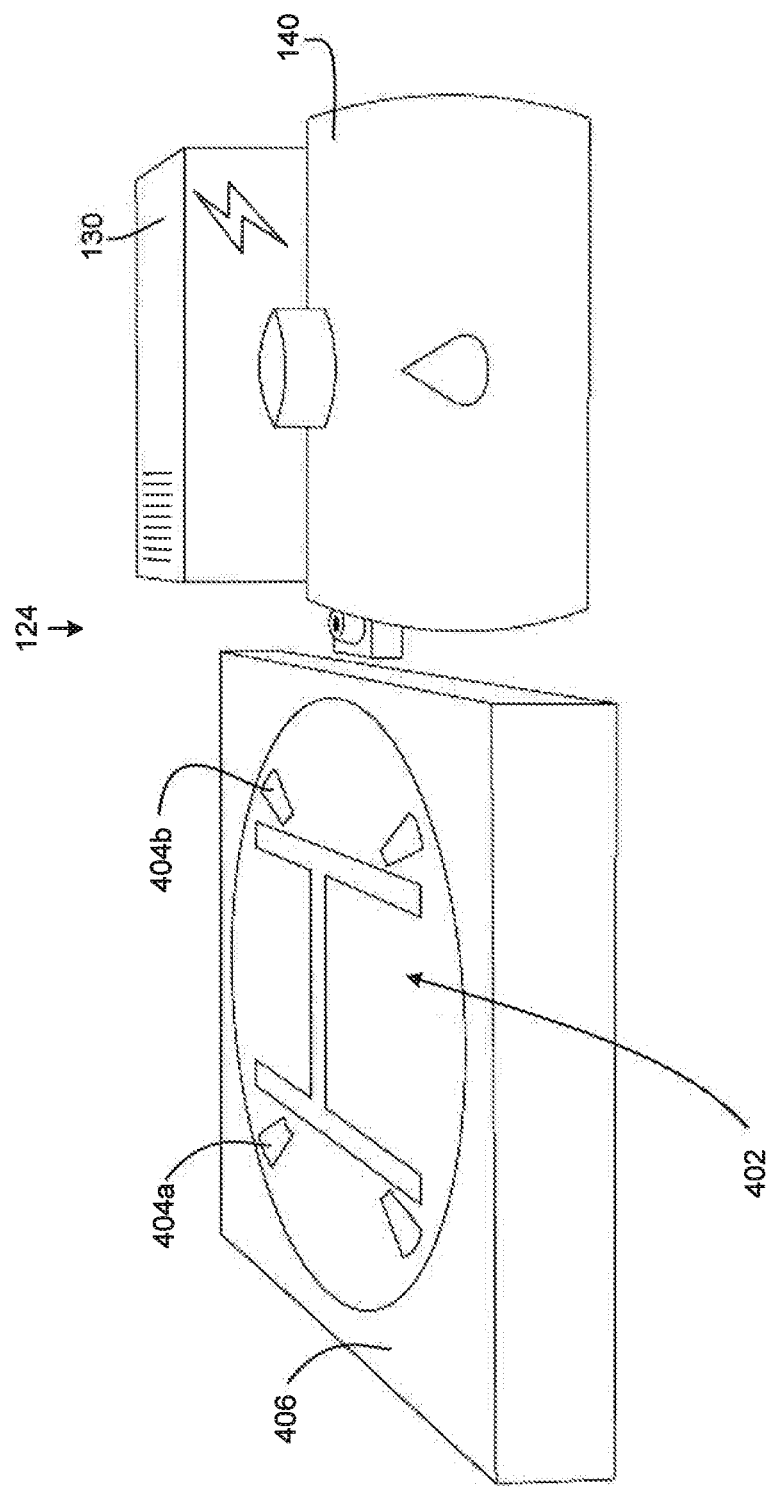
FIG. 4 is a perspective view of a base station configured to provide power, material and data connections to an aerial vehicle, according to various aspects of the present disclosure.
Figure 5:
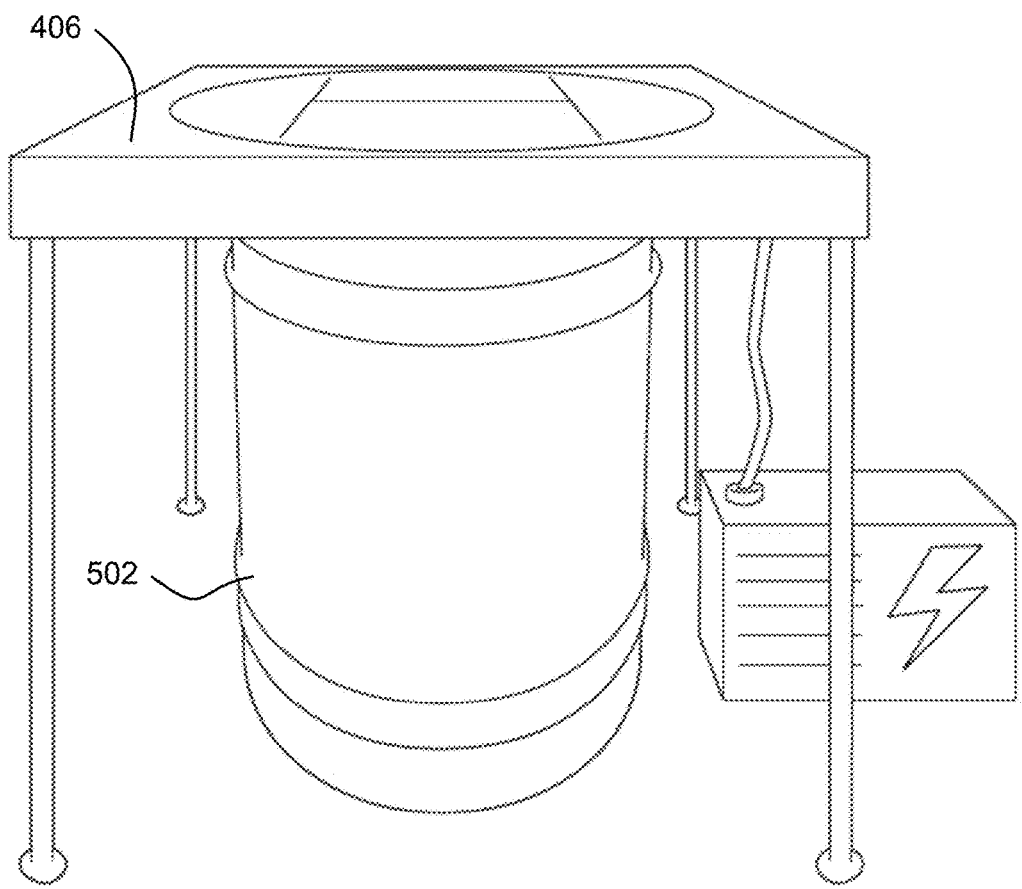
FIG. 5 is a side view of a base station having a landing platform mounted on top of a container, according to various aspects of the present disclosure.

Referring now to FIGS. 4 and 5, views of a base station 124 configured to provide power and data connections and sprayable material to aerial vehicle 100, according to aspects of the present disclosure, is shown.

Base station 124 provides power, data, and fluid reservoirs for aerial vehicle 100 in order to facilitate operations. In some aspects, portions of base station 124 may be mountable on top of large paint buckets such as a five-gallon bucket. Base station 124 may be mobile/movable. In some aspects, base station 124 maybe one unit and include wheels.

Base station 124 includes a landing pad 402. Landing pad 402 may have machine readable markings in assist aerial vehicle 100 during landing. Base station 124 may employ sensors, GPS, or emitters to assist aerial vehicle 100 in determining and monitoring aerial vehicle 100 location. Landing pad 402 may also include power and data connections 404 (labeled, for clarity, only as connections 404*a-b* in FIG. 4) which aerial vehicle 100 connects with upon landing. A power source 130 is electrically connected to power connections 404 or optionally is a rechargeable power system or a power generator. One or more reservoirs containing selected fluids or other materials may be integrated or otherwise connected to base station 124 in order to provide such material to aerial vehicle 100. Base station 124 further includes a platform 406 configured to attach base station 124 to other physical devices or objects. In an aspect, platform 406 is configured to attach to container 502 shown in FIG. 5 in order to facilitate painting.

In some aspects, landing pad 402 may be a concave shape, allowing aerial vehicle 100 to successfully land even if it off center by sliding toward the center of landing pad 402 after making contact with the concave surface.

Figure 6:
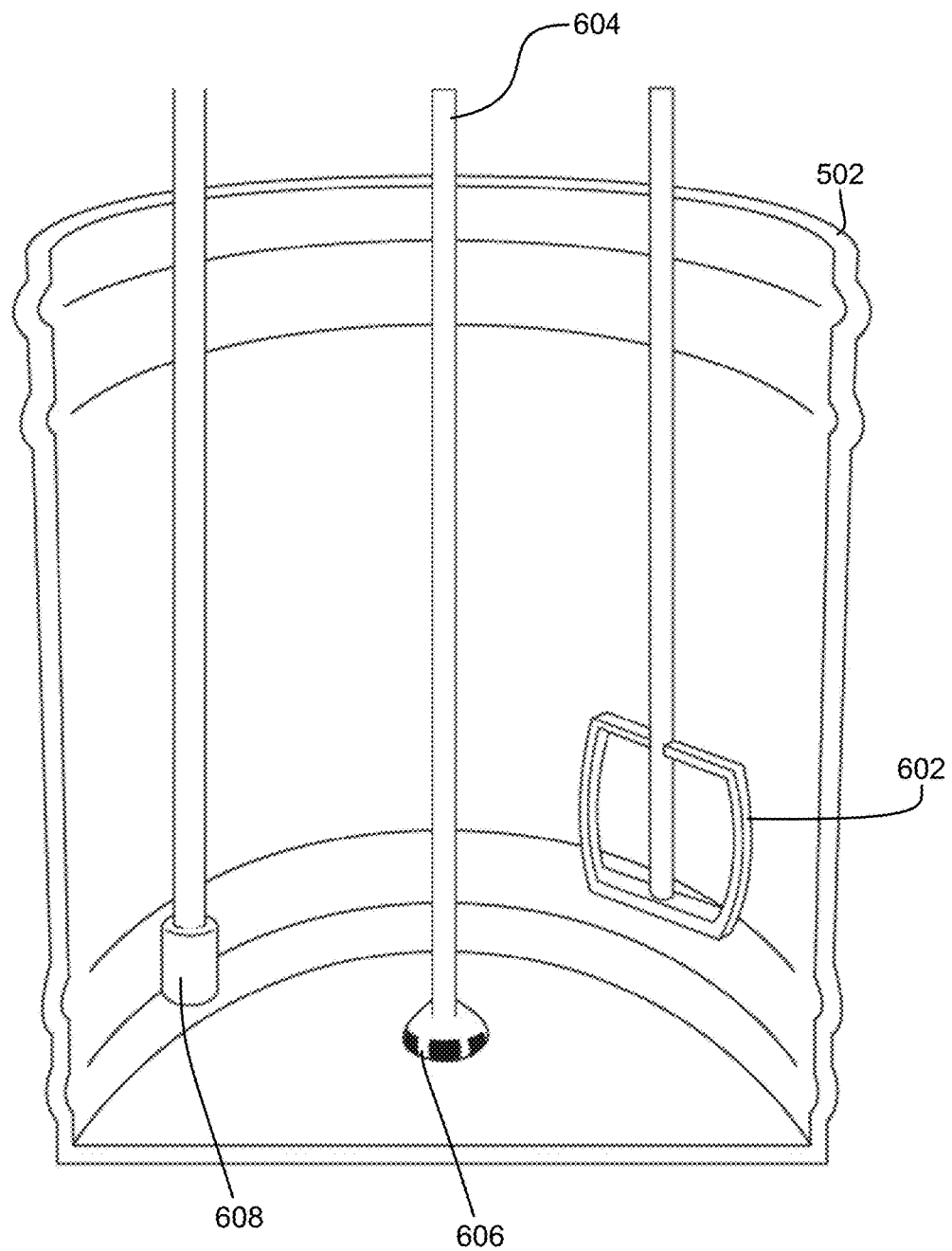
FIG. 6 is a side view of a reservoir connectable to an underside portion of the base station and provide paint or another fluid for use by the aerial vehicle, according to various aspects of the present disclosure.

Referring now to FIG. 6, a side view of a container 502 connectable to an underside portion of base station 124 and provide paint or another fluid for use by aerial vehicle 100, according to an aspect of the present disclosure, is shown.

In aspect, base station 124 further comprises an agitator 602, a siphon 604, and a sensor 606 and a material supply line 608, for maintaining the appropriate mixture of a large volume of paint during the performance of a painting or other sprayable material during aerial vehicle operations (e.g., painting an interior room, painting the exterior of a house or structure, spraying cleaning agents, chemicals, etc.). Agitator 602 maintains the mixture of paint and may be activated at preset intervals or in response to sensor data. Siphon 604 removes paint from container 502 and supplies it to aerial vehicle 100 when needed. Sensor 606 detects, for example, the level of paint within container 502 in order to alert a user when the paint level is low or that a job will require more paint than available and may be attached to siphon 604 or may be independent. Material supply line 608 or Siphon 604 may also be used to transfer liquid into container 502 such as paint thinner or water to ensure the material in container 502 is of the correct viscosity and consistency. As will be apparent to those skilled in the relevant art(s) after reading the description herein, onboard reservoir and/or reservoir 140 may each also include agitator 602, siphon 604 and/or sensor 606, thereby connecting such containers to aerial operations system 101 and facilitating supply, mixture and monitoring of sprayable material.

In an aspect, base station 124 is located near container 502 or some other source of paint of other material intended to be used by aerial vehicle 100 when performing tasks. Base station 124 may be connected via tubes or similar connections to container 502 or other containers or reservoirs.

In an aspect, aerial vehicle 100 is configured as a crop duster. Aerial vehicle 100 may fly between rows of crops (e.g., corn) and spray fertilizer, pesticide, or other desired materials on the crops.

Figure 7:
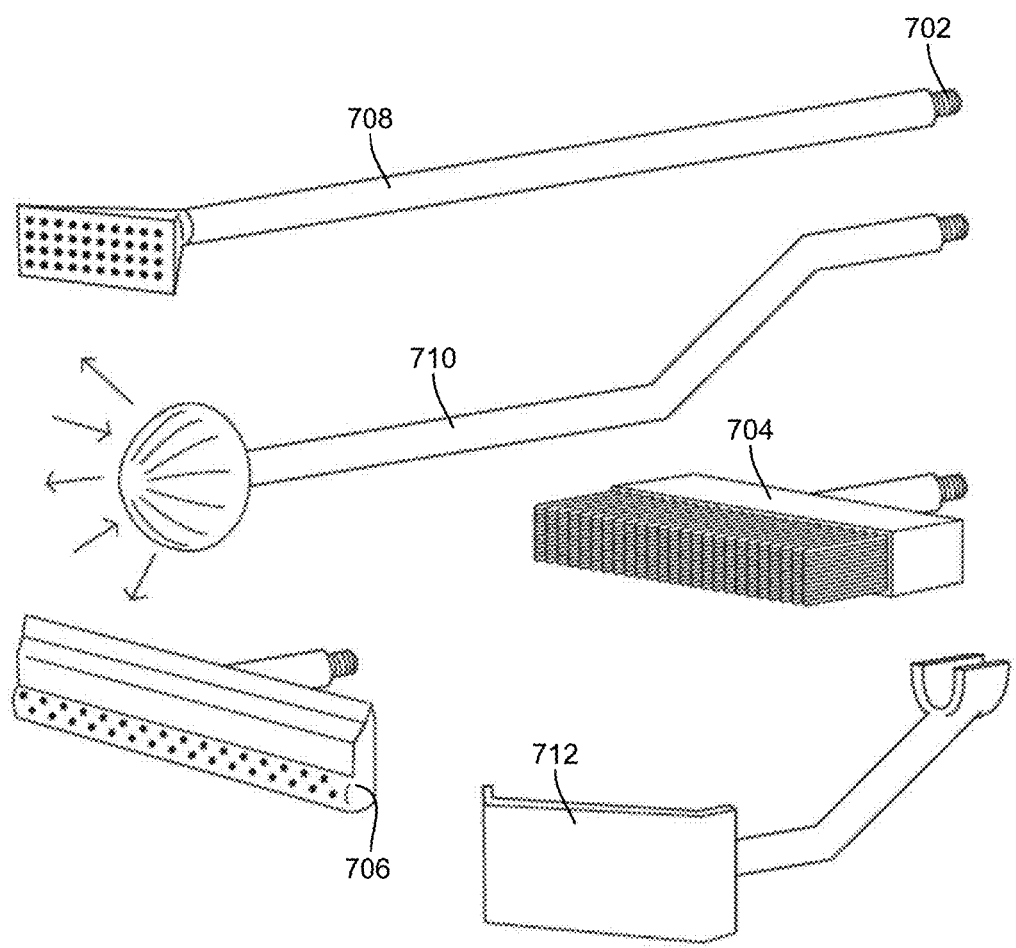
FIG. 7 is an image of a variety of modular add-ons usable with an aerial vehicle, according to various aspects of the present disclosure.

Referring now to FIG. 7, an image of a variety of modular add-ons 704, 706, 708, 710, and 712 usable with aerial vehicle 100, according to aspects of the present disclosure, are shown.

Figure 8:
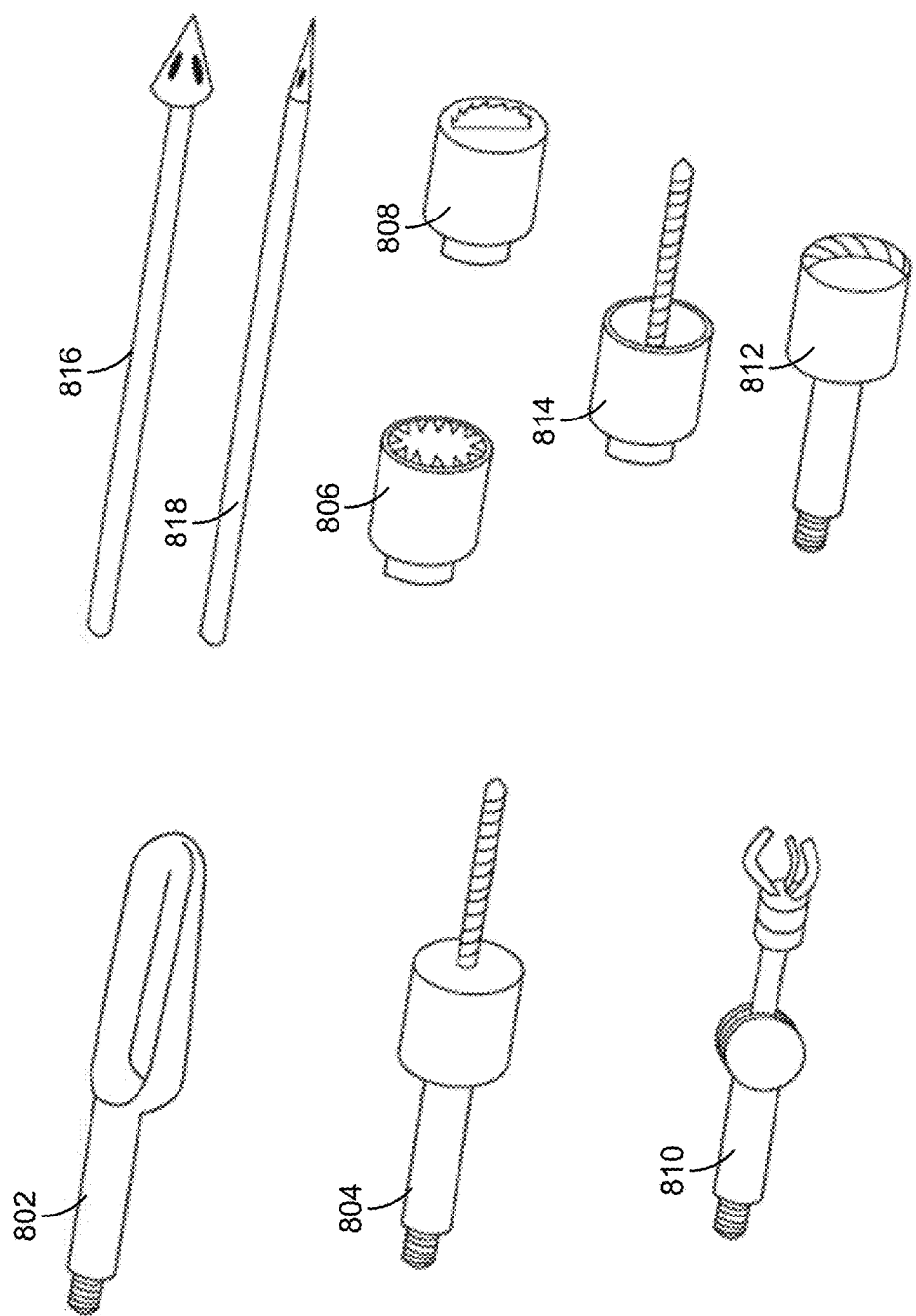
FIG. 8 is another image of a variety of modular add-ons usable with an aerial vehicle, according to various aspects of the present disclosure.

Add-ons shown in FIGS. 7 and 8 may be attached to aerial vehicle 100 via quick connections 702 attached to attachment points 132. Add-ons may take the place of one or more accessories or may augment accessories. Add-ons include, but are not limited to those depicted in FIGS. 7 and 8. Each add-on may be connected at accessory attachment point 132.

Add-ons may be selected with allow for multiple painting techniques or effects. For example, an add-on may position a stencil while a paint sprayer accessory applies the paint. Other effects such as creating a "stipple" paint effect by spraying the paint with one arm and then having the other arm, containing a stipple brush, can make contact with the wall with rapid connecting motions. Additional effects such as "rag wipe", sponge, running a stiff bristle "broom" through the paint to create lines, etc. can also be achieved.

Add-ons may include an arm to distribute solid materials (granules of fertilizer, shredded bark or mulch, etc.). The attachment end may "spin" similar to a broadcast spreader or it could vibrate and sprinkle material. The "broadcast spread" component/attachment also spreads chemicals, salt, ash, and other material for ice and snow removal/control. An add-on may comprise an arm or end to pull, move, remove, and/or relocate unwanted materials (trash/litter, weeds, etc.).

Brush add-on 704 may be attached to aerial vehicle 100 to facilitate cleaning a vertical or horizontal surface. Squeegee add-on 706 may be used to clean windows and may further comprise a motorized rotating portion. Sprayer add-on 708 and be used to spray air or water in order to for example clean objects or vacuum items. Sensor add-on 710 may be utilized to sample air quality, particulate matter concentrations, radiation and the like. Sensor add-on 710 may further comprise an arm extension and one or more filters. Overspray guard add-on 712 may comprise a physical barrier useful for preventing paint from dripping or spraying onto undesirable locations.

Referring now to FIG. 8, another image of a variety of modular add-ons 802, 804, 806, 808, 810, 812, 814, 816 and 818 usable with aerial vehicle 100, according to aspects of the present disclosure, is shown.

An add-on may be a material collector arm scoop add-on 802. Scoop add-on 802 may be an electric or mechanical "scoop" like wand/arm extension. Material collector arm drill add-on 804 is an electric or mechanical "drill" like wand/arm extension. Add on may be a material collector arm scoop add-on is an electric or mechanical "scoop" like wand/arm extension "back scoop" that can pivot and pull material into it. Material collector arm claw add-on 810 is an electric or mechanical "claw" like wand/arm extension that can pivot and grab material to it.

Twisting/screwing material cutter and collector add-on 808 is an example appendage that can be added to the end/tip of the Wand/Arm or it can be part of an entire modular and replaceable Wand/Arm that can burrow or cut or drill into materials to extract samples or cut and shape external material. Cutter add-on 806 and cutter add-on 812 are similar devices. Puncturing material cutter and collector add-on 814 is an example appendage that can be added to the end/tip of the Wand/Arm or it can be part of an entire modular and replaceable Wand/Arm that can burrow or cut or drill into materials to extract samples or cut and shape external material. Aerator or probe add-ons 816, 818 may be used to burrow or cut or drill into materials to extract samples or cut and shape external material. Furthermore add-ons 816 and 818 may be used to push against or into material to insert liquids, solids (pellets) or gasses that can push/puncture, drill or penetrate into materials or to extract liquids, solids, or gasses. Cutters and/or collectors add-ons 802, 804, 806, 808, 812, and 814 may also collect material by vacuuming/sucking materials in, including liquids, solids, and semi solids.

Figure 9:
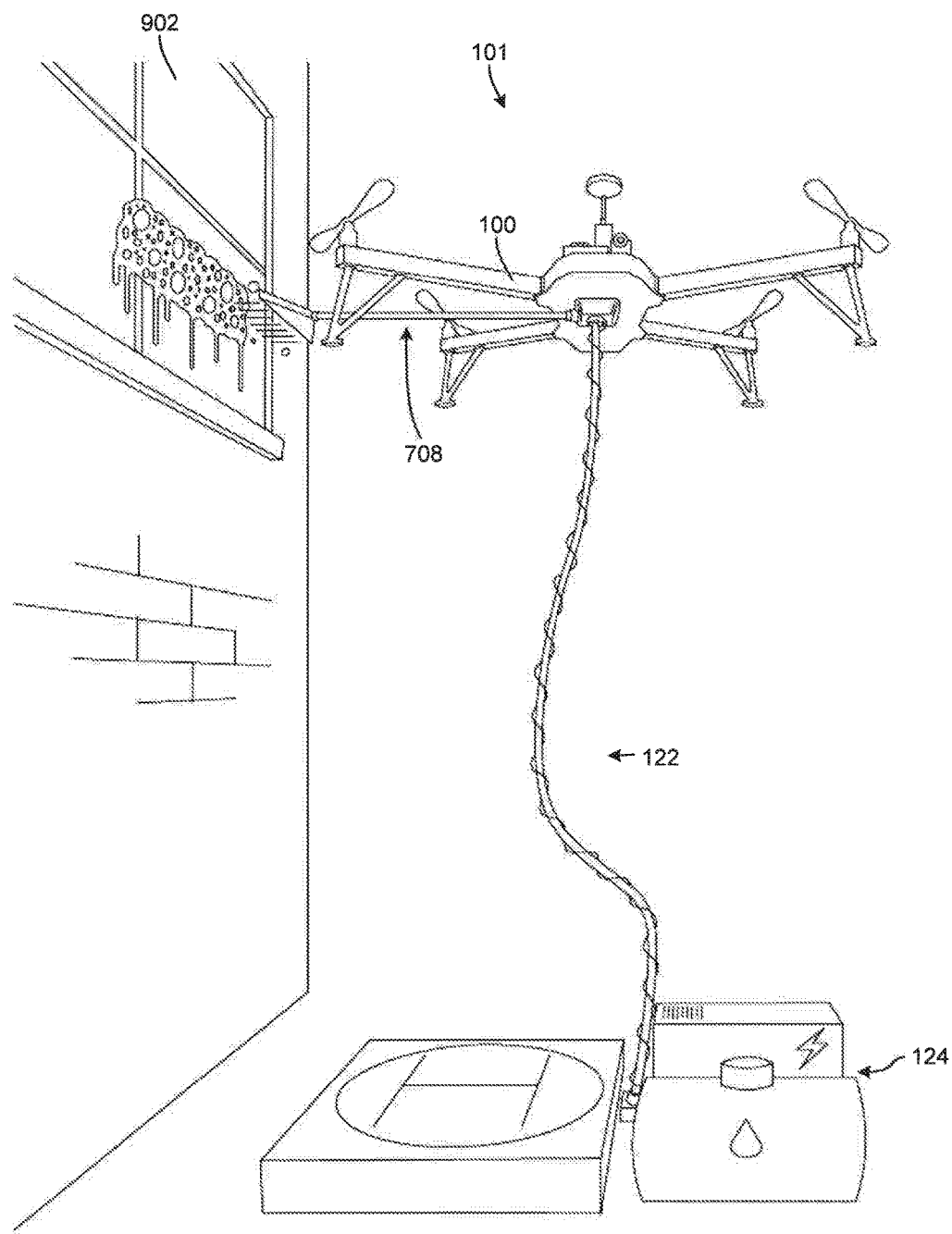
FIG. 9 is a perspective view of an aerial operations system configured to clean windows, according to various aspects of the present disclosure.

Referring briefly now to FIG. 9, a perspective view of an aerial operations system 101 configured to clean windows 902, according to various aspects of the present disclosure, is shown. Aerial vehicle 100 is equipped with sprayer 708 and sprays water, a mixture of water and soap, or another sprayable material in order to clean windows 902. The sprayable material may be sprayed at a high pressure. In other aspects, similar configurations are used to apply material coatings to windows 902 or other structures.

Figure 10:
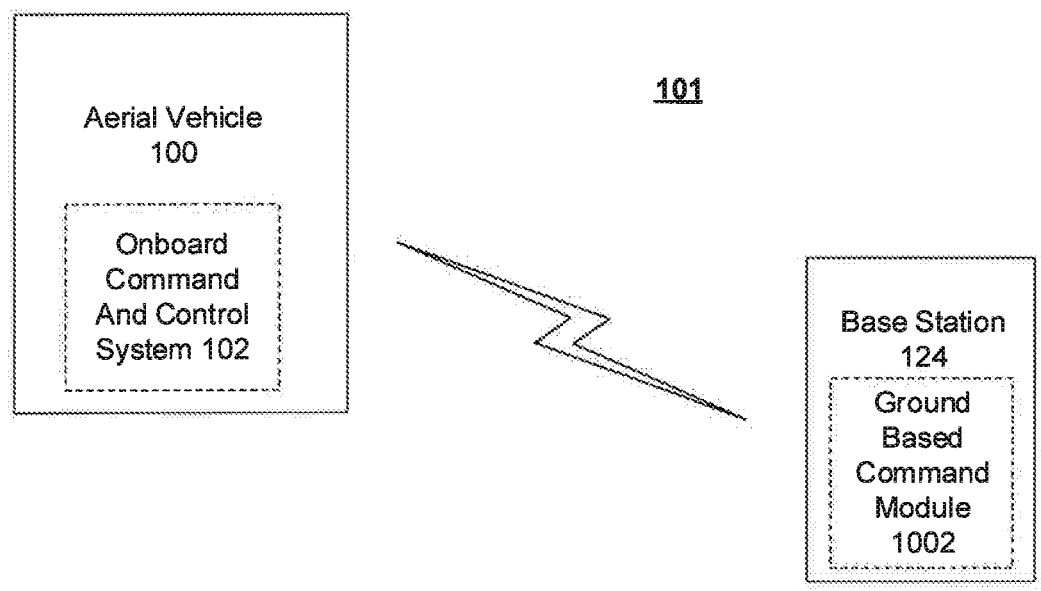
FIG. 10 is a dataflow diagram depicting wireless operation of the aerial operations system, according to various aspects of the present disclosure.

Referring now to FIG. 10, a dataflow diagram depicting wireless and/or wired (via the tether) operation of the aerial operations system 101, according to an aspect of the present disclosure, is shown.

Aerial operations system 101 comprises base station 124 and aerial vehicle 100. User may input commands at a ground based command module 1002 or using a device such as a cellular transceiver, cellular telephone, tablet, or portions thereof which can communicate with base station 124, aerial vehicle 100, or both devices. Commands may be wirelessly transmitted to aerial vehicle 100 and carried out via onboard command and control system 102. In some aspects, commands are general (e.g., proceed to position X, scan the wall, process the scan, determine areas to be painted and paint the wall) and command and control system 102 determines the appropriate actions to carry out the command. In other aspects, command module 1002 receives a general command and sends sub-commands to aerial vehicle 100 in order to execute the general command. Aerial vehicle 100 may transmit data and information back to base station 124. Such data may be analyzed by ground based command module 1002.

Figure 11:
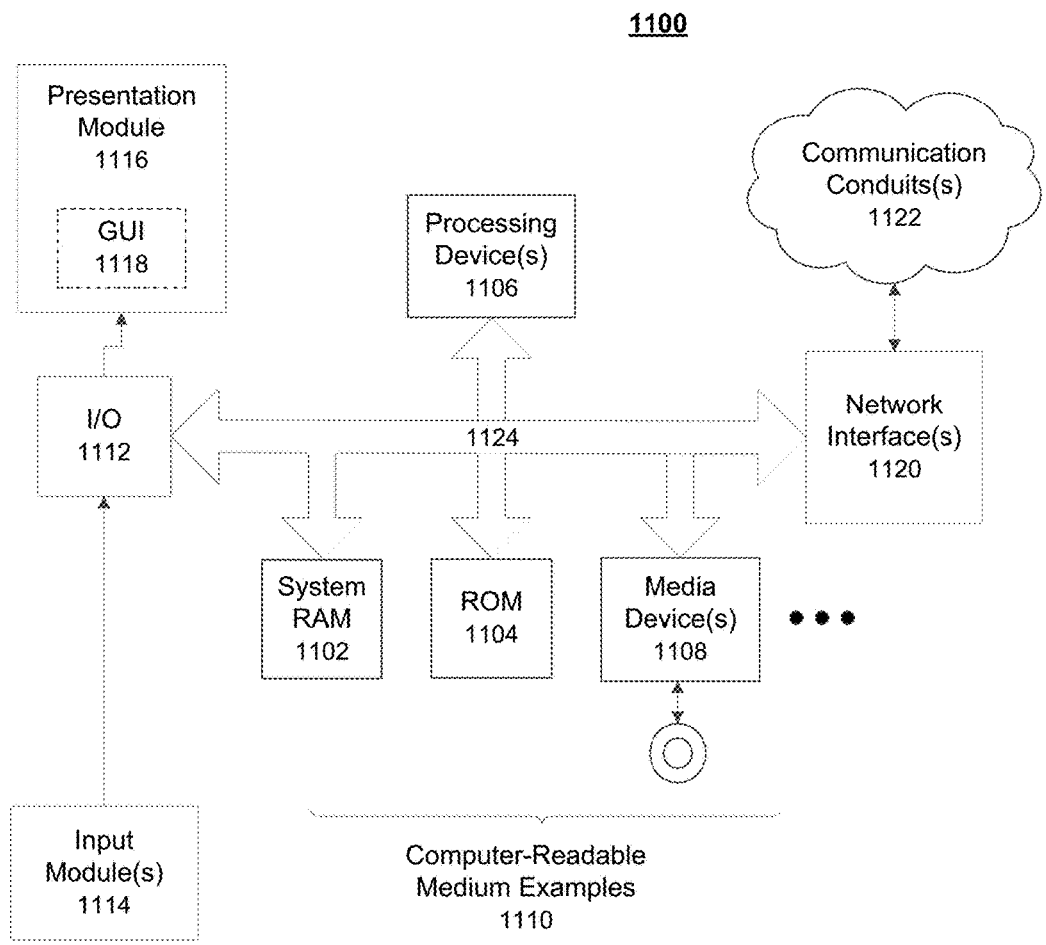
FIG. 11 is a block diagram of an example computing system useful for implementing various aspects of the present disclosure.
Figure 11:
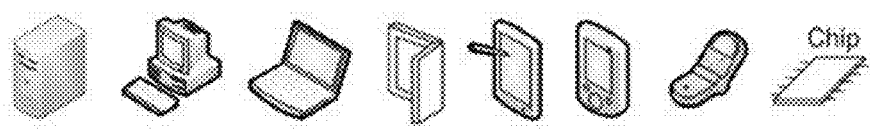

Referring now to FIG. 11, a block diagram of an exemplary computer system useful for implementing various aspects the processes disclosed herein, in accordance with one or more aspects of the present disclosure, is shown.

That is, FIG. 11 sets forth illustrative computing functionality 1100 that may be used to implement onboard command and control system 102, ground based command module 1002, or any other portion of aerial operations system 101. In all cases, computing functionality 1100 represents one or more physical and tangible processing mechanisms.

Computing functionality 1100 may comprise volatile and non-volatile memory, such as RAM 1102 and ROM 1104, as well as one or more processing devices 1106 (e.g., one or more central processing units (CPUs), one or more graphical processing units (GPUs), and the like). Computing functionality 1100 also optionally comprises various media devices 1108, such as a hard disk module, an optical disk module, and so forth. Computing functionality 1100 may perform various operations identified above when the processing device(s) 1106 executes instructions that are maintained by memory (e.g., RAM 1102, ROM 1104, and the like).

More generally, instructions and other information may be stored on any computer readable medium 1110, including, but not limited to, static memory storage devices, magnetic storage devices, and optical storage devices. The term "computer readable medium" also encompasses plural storage devices. In all cases, computer readable medium 1110 represents some form of physical and tangible entity. By way of example, and not limitation, computer readable medium 1110 may comprise "computer storage media" and "communications media."

"Computer storage media" comprises volatile and non-volatile, removable and non-removable media implemented in any method or technology for storage of information, such as computer readable instructions, data structures, program modules or other data. Computer storage media may be, for example, and not limitation, RAM 1102, ROM 1104, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 1100 may also comprise an input/output module 1112 for receiving various inputs (via input modules 1114), and for providing various outputs (via one or more output modules). One particular output mechanism may be a presentation module 1116 and an associated GUI 1118. Computing functionality 1100 may also include one or more network interfaces 1120 for exchanging data with other devices via one or more communication conduits 1122. In some aspects, one or more communication buses 1124 communicatively couple the above-described components together.

Communication conduit(s) 1122 may be implemented in any manner (e.g., by a local area network, a wide area network (e.g., the Internet), and the like, or any combination thereof). Communication conduit(s) 1122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "service," "module" and "component" as used herein generally represent software, firmware, hardware or combinations thereof. In the case of a software implementation, the service, module or component represents program code that performs specified tasks when executed on one or more processors. The program code may be stored in one or more computer readable memory devices, as described with reference to FIG. 11. The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

Aerial operations system 101 may be configured in other ways and/or utilized to perform other tasks including but not limited to following a person and take video/photos. For example, using either an RFID chip or a connection to the person's cell phone the aerial vehicle 100 can follow the person, running a race for example, and capture video of the event, while also autonomously navigating obstacles such as power lines.

Additionally, aerial operations system 101 may be configured to: inspect for damage in high rise buildings, towers, bridges, airplanes, dams and the like.

Aerial operations system 101 may be configured to: collect soil samples, drill into the ground in order to collect samples, assist in the search for lost children, locate various items, retrieve items from cabinets, bring beverages, and the like While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the systems, apparatus and methods of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An aerial operations system, comprising:
an unmanned aerial vehicle comprising a sprayer comprising a spray nozzle to spray a paint;
a base station comprising a sprayable material supply and a power supply;
a tether interconnecting the unmanned aerial vehicle and the base station, the tether providing the aerial vehicle with power from the power supply and a sprayable material from the sprayable material supply wherein the sprayable material comprises the paint;
at least one sensor on the unmanned aerial vehicle to sense a surface of a structure to be painted; and
a command and control system, in response to inputs from the at least one sensor, to pilot the unmanned aerial vehicle to an attitude, altitude and a position along a flight path relative to the surface for spraying the paint on the surface through the spray nozzle, the spray nozzle being positioned relative to the surface to apply the paint from a calculated distance being calculated based on wind speed and at least one of spray material viscosity and desired thickness of the paint and wherein the command and control system to position and at least one of extend, adjust orientation of and retract the spray nozzle to apply the paint to the surface.

2. The aerial operations system of claim 1, wherein the unmanned aerial vehicle is a multi-rotor rotorcraft.

3. The aerial operations system of claim 1, wherein the surface is one of an interior wall, an exterior wall shutters, a bridge or a tower.

4. The aerial operations system of claim 1, wherein the sprayable material supply is a reservoir.

5. The aerial operations system of claim 1, wherein the unmanned aerial vehicle being configured to access a manufacturer's information related to the paint, wherein the information includes the viscosity.

6. The aerial operations system of claim 1, wherein the base station further comprises a secondary fluid supply configured to mix with the sprayable material.

7. The aerial operations system of claim 6, wherein the secondary fluid is one of: a soap, a liquid adhesive, a binder, or a paint thinner.

8. The aerial operations system of claim 1, the unmanned aerial vehicle further comprising:
an onboard backup power source.

9. The aerial operations system of claim 1, the unmanned aerial vehicle further comprising:
an onboard sprayable material reservoir.

10. The aerial operations system of claim 9, wherein the onboard sprayable material reservoir is detachable from the unmanned aerial vehicle.

11. The aerial operations system of claim 1, wherein the tether comprises a wired connection between the command and control system and the unmanned aerial vehicle and wherein the command and control system controls the unmanned aerial vehicle.

12. The aerial operations system of claim 1, wherein the base station comprises the command and control system, the command and control system controls the unmanned aerial vehicle.

13. The aerial operations system of claim 12, wherein the command and control system comprises a wireless communications transceiver configured to communicate with the unmanned aerial vehicle and a user input device.

14. The aerial operations system of claim 1, wherein the flight path is a raster flight pattern or other flight pattern to apply the paint to the surface.

15. The aerial operations system of claim 1, the unmanned aerial vehicle further comprising a paint application sensor configured to detect a material application quantity applied to the structure.

16. The aerial operations system of claim 15, further comprising an environmental sensor communicatively connected to the command and control system.

17. The aerial operations system of claim 1, wherein the sprayer is connected for controllable movement to the unmanned aerial vehicle.

18. The aerial operations system of claim 1, further comprising an add-on for selective attachment to the unmanned aerial vehicle to create effects within the paint including one of a rag wipe effect, a sponge effect, and stiff bristle.

19. The aerial operations system of claim 1, further comprising a mount positioned between the sprayer and an aerial vehicle body, configured for detaching the sprayer and attaching another add-on.

20. The aerial operations system of claim 19, wherein the mount being coupled to the tether which comprises fluid and electrical connections.

21. The aerial operations system of claim 19, comprising an accessory attachment point positioned on the mount on the aerial vehicle body and configured for attaching an add-on.

22. The aerial operations system of claim 1, further comprising a user input device configured to receive aerial vehicle commands.

23. The aerial operations system of claim 22, wherein the user input device wirelessly connects to the base station.

24. The aerial operations system of claim 22, wherein the user input device is integrated into the base station.

25. An aerial operations system, comprising:
an unmanned aerial vehicle comprising at least one accessory attachment point;
a plurality of add-on accessories releasably connected individually to the unmanned aerial vehicle at the at least one accessory attachment point, the plurality of add-on accessories comprises a first add-on accessory configured to physically interact with and make contact with a surface of a structure and a second add-on accessory being a paint sprayer comprising a sprayer nozzle to paint at least a portion of the structure;
at least one sensor on the unmanned aerial vehicle to sense the surface of the structure to create sensor inputs;
a base station comprising: a command and control system controlling the unmanned aerial vehicle in response to the sensor inputs and a connected add-on accessory; and a power supply; and
a tether interconnects the unmanned aerial vehicle and the base station, the tether providing the unmanned aerial vehicle with power from the power supply and provides communications from the command and control system to the unmanned aerial vehicle,
wherein the command and control system, in response to the inputs from the at least one sensor, pilots the unmanned aerial vehicle to an attitude, altitude and a position along a flight path relative to the surface for spraying the paint on the surface through the spray nozzle, when painting, the spray nozzle being positioned relative to the surface to apply the paint from a calculated distance being calculated based on wind speed and at least one of spray material viscosity and desired thickness of the paint and wherein the command and control system to position and at least one of extend, adjust orientation of and retract the spray nozzle to apply the paint to the surface.

26. The aerial operations system of claim 25, wherein the first add-on accessory is a washing device.

27. The aerial operations system of claim 26, the base station further comprising a water source, the tether configured to provide the water to the unmanned aerial vehicle.

28. The aerial operations system of claim 25, wherein the first add-on accessory is on of: a brush, a movable scoop, an aerator, a drill, or a claw.

* * * * *